US006451265B1

(12) United States Patent
Misuraca

(10) Patent No.: US 6,451,265 B1
(45) Date of Patent: Sep. 17, 2002

(54) POLYMER ACTIVATION ASSEMBLY WITH SELF COMPENSATING HIGH SHEAR ACTIVATION NOZZLE

(76) Inventor: Alfonso M. Misuraca, 34 Gifford Rd., Somerset, NJ (US) 08873

( * ) Notice: Subject to any disclaimer, the term of this patent is extended or adjusted under 35 U.S.C. 154(b) by 770 days.

(21) Appl. No.: 08/786,228

(22) Filed: Jan. 21, 1997

(51) Int. Cl.[7] ................................................ B32B 27/00

(52) U.S. Cl. ....................... 422/131; 422/256; 422/278; 523/334; 366/176.2; 366/173.1; 366/336; 366/338

(58) Field of Search ................................ 422/131, 278, 422/135, 256; 523/334; 366/336, 338, 176.2, 172.1, 173.1, 174.1, 176.1, 182.4, 177.1, 183.2, 337

(56) References Cited

U.S. PATENT DOCUMENTS 1,925,787 A 9/1933 Brooks .......................... 99/11
2,124,580 A * 7/1938 Lavine .................... 366/176.2
2,817,500 A * 12/1957 Robinson ................. 366/176.2
2,974,131 A 3/1961 McLeod .................... 260/94.9
3,432,483 A 3/1969 Peoples et al. ............ 260/87.3
4,199,267 A * 4/1980 Hendrikz ................. 366/176.2
4,701,055 A 10/1987 Anderson ................... 366/336
5,135,968 A 8/1992 Brazelton et al. ........... 523/313

* cited by examiner

*Primary Examiner*—Marian C. Knode
*Assistant Examiner*—Basia Ridley
(74) *Attorney, Agent, or Firm*—Selitto, Behr & Kim

(57) ABSTRACT

An assembly for mixing a polymer with water and activating the polymer includes a water/polymer mixing chamber immediately preceding a high shear nozzle formed by a spring loaded plug seated against an outlet orifice of the mixing chamber.

10 Claims, 1 Drawing Sheet

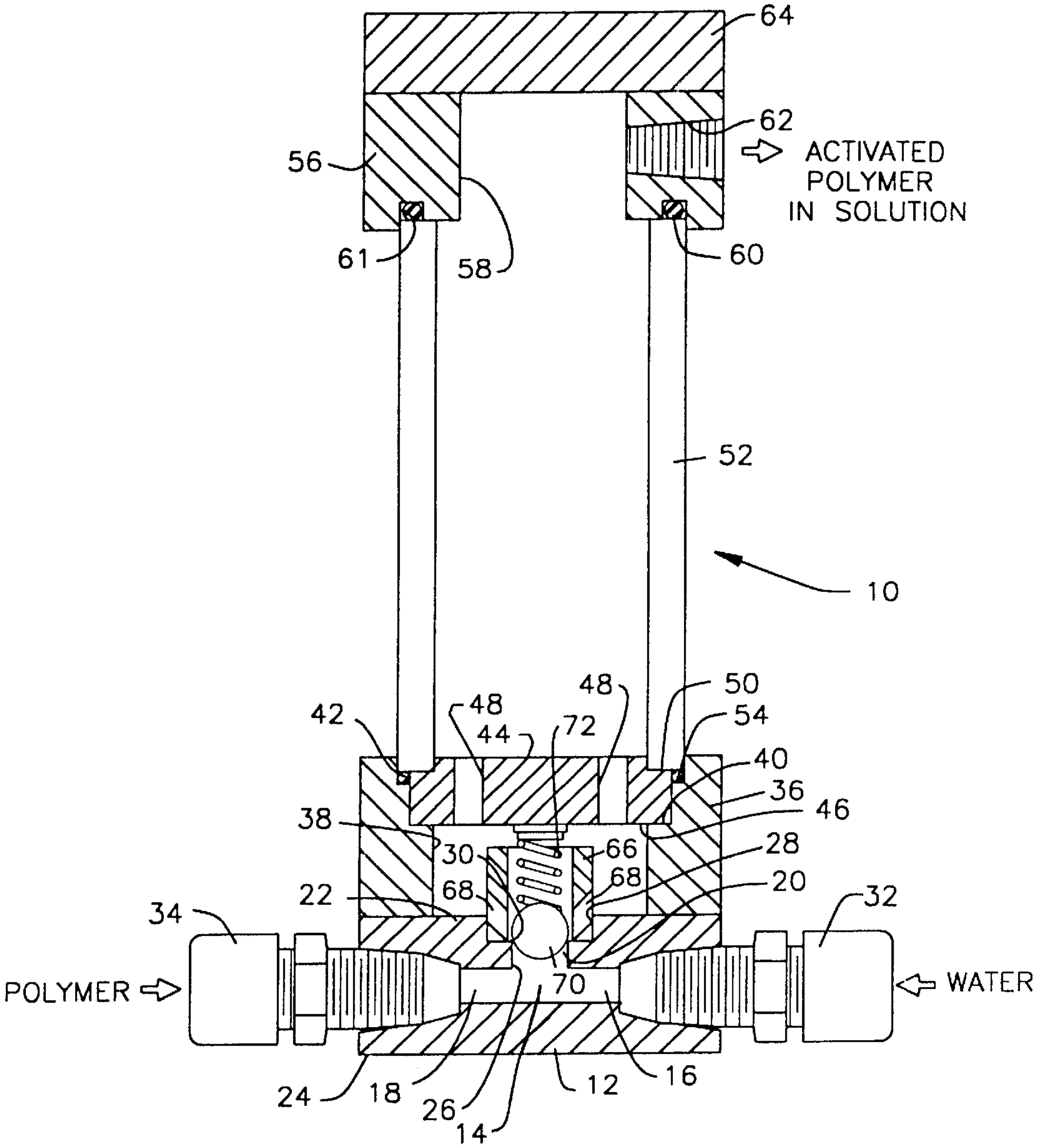
64
62
ACTIVATED
POLYMER
IN SOLUTION
56
61
58
60
52
10
42
48
44
72
48
50
54
40
36
46
38
30
66
28
68
68
20
22
34
32
POLYMER
70
WATER
24
18
26
14
12
16

POLYMER ACTIVATION ASSEMBLY WITH SELF COMPENSATING HIGH SHEAR ACTIVATION NOZZLE

BACKGROUND OF THE INVENTION

This invention relates to the dilution and activation of a polymer in water and, more particularly, to an improved assembly which accomplishes such dilution and activation without any moving parts.

Polymers are typically used in treating wastewater by liquid/solid separation. The polymer is typically transported to the wastewater treatment facility with its molecules tangled together in many microscopic size balls coated with an oil-like film (i.e., in beads). To utilize the polymer, the polymer is diluted in water and activated by breaking up the bead surface film and untangling the molecules of the polymer.

It would be desirable to provide an assembly for activating polymers diluted with water that does not use mechanical mixers, automatically compensates for fluctuations in the flow rate of the polymer and the water, prevents the polymer from activating prematurely, and results in a high percentage of polymer activation.

SUMMARY OF THE INVENTION

The foregoing and additional objects are attained in accordance with the principles of this invention by providing an assembly for mixing a polymer with water and activating the polymer. The assembly comprises a mixing chamber having a first inlet, a second inlet and an outlet orifice having a peripheral seat at its distal end. Water is introduced to the first inlet and polymer is introduced to the second inlet. A plug outside the mixing chamber is yieldably biased against the outlet orifice seat. Accordingly, the flow of the mixed water and polymer exerts a force against the plug from within the mixing chamber which causes the plug to move away from the outlet orifice seat against the biasing force holding the plug against the seat. This provides a small gap between the plug and the outlet orifice seat which results in the activation by shearing of polymer passing through the gap.

In accordance with an aspect of this invention, the outlet orifice seat is formed as a planar circle and the plug is a sphere having a diameter greater than the diameter of the circle.

In accordance with another aspect of this invention, the ratio of the diameter of the sphere to the diameter of the circle is approximately four to three.

In accordance with a further aspect of this invention, the outlet orifice seat has a cross-section shaped as a right angled corner.

BRIEF DESCRIPTION OF THE DRAWING

The foregoing will be more readily apparent upon reading the following description in conjunction with the drawing in which the single FIGURE thereof is a longitudinal cross sectional view of an illustrative assembly constructed in accordance with the principles of this invention.

DETAILED DESCRIPTION

As illustrated, the inventive assembly, designated generally by the reference numeral 10, includes a first block 12 in which is formed a mixing chamber 14, a first inlet 16, a second inlet 18 and an outlet orifice 20. The block 12 has a pair of opposed parallel planar major surfaces 22, 24 and the inlets 16, 18, along with the mixing chamber 14, are formed by first and second circular bores extending into the block 12 parallel to the major surfaces 22, 24 and intersecting in a central region of the block. Although the bores are shown as being co-linear, it is understood that they can enter the block 12 at angles other than 180° to each other. A third circular bore 26 extends into the block 12 from and orthogonal to the major surface 22 and terminates at the intersection of the first and second bores. The block 12 further has a circular counterbore 28 extending into the block 12 from and orthogonal to the major surface 22 and coaxial to the bore 26 to provide a seal edge, or seat, 30 where the counterbore 28 meets the bore 26. Illustratively, this seal edge 30 has a cross-section shaped as a right angled corner. The seal edge 30 defines the periphery of the outlet orifice 20 at its distal end.

A first fitting 32 is installed in the inlet 16 to allow the introduction of a flow of water therein. Similarly, a second fitting 34 is installed in the inlet 18 to allow the introduction of a flow of polymer therein.

A second block 36 is secured to the surface 22, illustratively by bolts (not shown). The block 36 has a central circular throughbore 38 with two steps 40, 42 at its distal end. Seated on, and secured to, the step 40 is a plate member 44 having a planar major surface 46 facing and parallel to the major surface 22 of the block 12. The plate member 44 is formed with a plurality of apertures 48.

The plate member 44 is formed with an outer peripheral step 50 and secured within the step 50 is a cylindrical sight glass 52. The sight glass 52 extends beyond the outer periphery of the plate member 44 and a gasket 54 resting on the step 42 of the block 36 seals the assembly at that point.

At the distal end of the sight glass 52, a third block 56 having a circular throughbore 58 is secured to the sight glass 52, with the gasket 60 in the groove 61 providing a seal. A threaded aperture 62 is formed in the block 56, communicating with the throughbore 58. An appropriate fitting (not shown) is installed in the aperture 62 to act as an outlet for the assembly 10. The block 56 is capped by a fourth block 64, which is secured thereto illustratively by bolts (not shown), to close the assembly 10.

A hollow cylindrical guide sleeve 66 having a plurality of apertures 68 is disposed in the counterbore 28 and is secured to the block 12. The inner diameter of the guide sleeve 66 is larger than the diameter of the circular bore 26. The guide sleeve 66 has a longitudinal central axis and each of the apertures 68 illustratively extends through the guide sleeve 66 at an acute angle to the axis from the interior of the guide sleeve 66 at the sleeve end which is within the counterbore 28. The apertures 68 are illustratively equiangularly spaced around the guide sleeve 66. A sphere 70 is disposed in the guide sleeve 66. The sphere 70 has a diameter greater than the diameter of the circular bore 26. Illustratively, the ratio of the diameter of the sphere 70 to the diameter of the bore 26 is approximately four to three. A compression spring 72 is also disposed within the guide sleeve 66. One end of the spring 72 bears against the surface 46 of the plate member 44 and the other end of the spring 72 bears against the sphere 70 to yieldably bias the sphere 70 into sealing engagement with the seal edge 30. Although a sphere has been illustrated as the seal plug, it is understood that other shapes of plugs, such as conical, can be utilized as well, provided they have a cross section matching the shape of the outlet orifice.

To manufacture the assembly 10, the block 46 is secured to the block 12 and the guide sleeve 66 is secured to the block 12 in the counterbore 28. The sphere 70 and the spring 72 are dropped into the guide sleeve 66 and the plate member 44 is installed. The gasket 54 is put in place and the sight glass 52 is installed. The gasket 60 is placed into the groove 61 of the block 56 and the block 56 is installed on the sight glass 52. The block 64 is then secured to the block 56. Appropriate fittings are then installed.

In operation, a flow of water is introduced into the fitting 32 and a flow of polymer is introduced into the fitting 34. The polymer and the water come together in the mixing chamber 14, which is of minimum volume, and is just before a high shear nozzle formed by the sphere 70 and the seal edge 30 of the outlet orifice 20. The size of the mixing chamber 14 has to be so small that the polymer and water mixture does not get a chance to form agglomerations before it passes through the high shear nozzle. To prevent such agglomeration, the mixture should pass through the nozzle almost immediately after mixing (i.e., within one half to one second). Further, to obtain the shear which activates the polymer, what is required is a small gap to provide high velocity and turbulence. The pressure of the incoming mixture against the sphere 70 compresses the spring 72 sufficiently so that the sphere 70 is unseated from the seal edge 30 to form the required small gap, preferably less than ⅛41 . The activated polymer and water mixture then passes through the apertures 68, through the apertures 48, and exits the assembly 10 through the outlet 62.

As the mixture flow rate changes, the nozzle gap also changes to keep the mixture flow force acting on the sphere 70 high enough to counteract the force of the spring 72. As the gap size changes, its flow capacity for a specific pressure difference also changes. The flow capacity of the system is self compensating to maintain a specific pressure difference over a limited flow range. The lower limit is where the desired flow rate equals the leakage between the sphere 70 and the seal edge 30, or where the flow is so low that the polymer and water mixture forms agglomerations before it passes through the nozzle. The upper limit is where the gap area change is not enough to compensate for additional flow without a substantial increase in pressure difference.

The strength of the spring 72 is selected by an empirical process for each specific polymer being activated. This is accomplished by measuring the viscosity of the mixture as it leaves the assembly 10. A higher viscosity indicates a higher percentage of activation. The strength of the spring 72 is made stronger until the viscosity levels off.

Although the preferred embodiment has been shown with a biasing spring 72, it has been found that for polymers with a viscosity below a particular threshold, a spring may not be necessary. Since the assembly 10 preferably is oriented vertically, as illustrated in the drawing, in such orientation the weight of the sphere 70 is sufficient for such low viscosity polymers to provide the necessary biasing force against the seal edge 30. Accordingly, in such a situation, the gravitational force acting on the sphere 70 functions as the yieldable biasing force blocking the outlet orifice.

Accordingly, there has been disclosed an improved polymer activation assembly with a self compensating high shear activation nozzle. While an illustrative embodiment of the present invention has been disclosed herein, it is understood that various modifications and adaptations to the disclosed embodiment will be apparent to those of ordinary skill in the art and it is intended that this invention be limited only by the scope of the appended claims.

What is claimed is:

1. An assembly for mixing a polymer with water and activating the polymer, comprising:

a mixing chamber having a first inlet, a second inlet and an outlet orifice having a peripheral seat at its distal ends wherein said seat has a cross-section shaped as a right angled corner;

means for introducing a flow of said water to said first inlet;

means for introducing a flow of said polymer to said second inlet;

a plug disposed outside said mixing chamber and shaped to seal said outlet orifice along said seat; and means for yieldably biasing said plug against said outlet orifice peripheral seat;

whereby the flow of the mixed water and polymer exerts a force against said plug which causes said plug to move away from said outlet orifice seat against the force exerted by said biasing means so as to provide a gap between said plug and said outlet orifice seat which results in the activation by shearing of polymer passing through said gap.

2. The assembly according to claim 1 wherein said outlet orifice peripheral seat is formed as a planar circle and said plug includes a sphere having a diameter greater than the diameter of said circle.

3. The assembly according to claim 1 further comprising a plate member supported outside said mixing chamber and spaced from said outlet orifice, and wherein said biasing means comprises a compression spring having a first end engaging said plate and a second end engaging said plug.

4. The assembly according to claim 3 further comprising a sleeve surrounding said plug and said spring, said sleeve having a first end secured to the exterior of said mixing chamber surrounding said outlet orifice peripheral seat.

5. The assembly according to claim 4 wherein the other end of said sleeve is spaced from said plate and said sleeve is formed with a plurality of apertures.

6. The assembly according to claim 5 wherein said outlet orifice seat is formed as a planar circle and said plug includes a sphere having a diameter greater than the diameter of said circle.

7. The assembly according to claim 6 wherein said sleeve is a hollow cylinder having a longitudinal central axis, and each of said plurality of apertures extends through said sleeve at an acute angle to said axis from the interior of said sleeve at said sleeve first end.

8. The assembly according to claim 7 wherein said plurality of apertures are equiangularly spaced around said sleeve.

9. The assembly according to claim 6 wherein the ratio of the diameter of said sphere to the diameter of said circle is approximately four to three.

10. A polymer activation assembly having a self compensating high shear activation nozzle, the assembly comprising:

a block having a pair of opposed parallel planar major surfaces with first and second circular bores extending into said block parallel to said major surfaces and intersecting in a central region of said block, said block having a third circular bore extending thereinto from one of said major surfaces orthogonal to said one of said major surfaces and terminating at the intersection of said first and second bores, said block further having a circular counterbore extending thereinto from and orthogonal to said one of said major surfaces and coaxial with said third bore so as to provide a seal edge where said third bore meets said counterbore, wherein said seal edge has a cross-section shaped as a right angled corner;

hollow structure having an open end secured to said one of said major surfaces and surrounding said counterbore, said hollow structure having an outlet remote from said one of said major surfaces;

an apertured plate member secured to and within said hollow structure, said plate member having a planar major surface facing and parallel to said one of said major surfaces of said block;

a hollow cylindrical apertured sleeve member having a longitudinal central axis, the inner diameter of said sleeve member being larger than the diameter of said third bore and the outer diameter of said sleeve member being smaller than the diameter of said counterbore, a first end of said sleeve member being secured to said block in said counterbore with said sleeve member being coaxial with said third bore, the length of said sleeve member being less than the distance between said seal edge and said major surface of said plate member;

a sphere disposed in said sleeve member and having a diameter larger than the diameter of said third bore; and a compression spring disposed in said sleeve member, a first end of said spring engaging said major surface of said plate member and a second end of said spring engaging said sphere so that said sphere is yieldably biased into sealing engagement with said seal edge;

whereby when a flow of water is introduced into said first bore and a flow of polymer is introduced into said second bore, the water and the polymer mix in said third bore, the force of the flow against the sphere unseats the sphere from the seal edge to provide a gap, the polymer flowing through the gap is activated by shearing, and the activated polymer flows into the hollow structure and out the outlet.

* * * * *